April 11, 1950      R. A. M. BARBEY      2,503,932
ELECTRIC CALCULATING MACHINE

Filed Oct. 17, 1947      2 Sheets-Sheet 1

INVENTOR
RAYMOND ALPHONSE MARIE BARBEY
BY Otto Munk
HIS ATTY

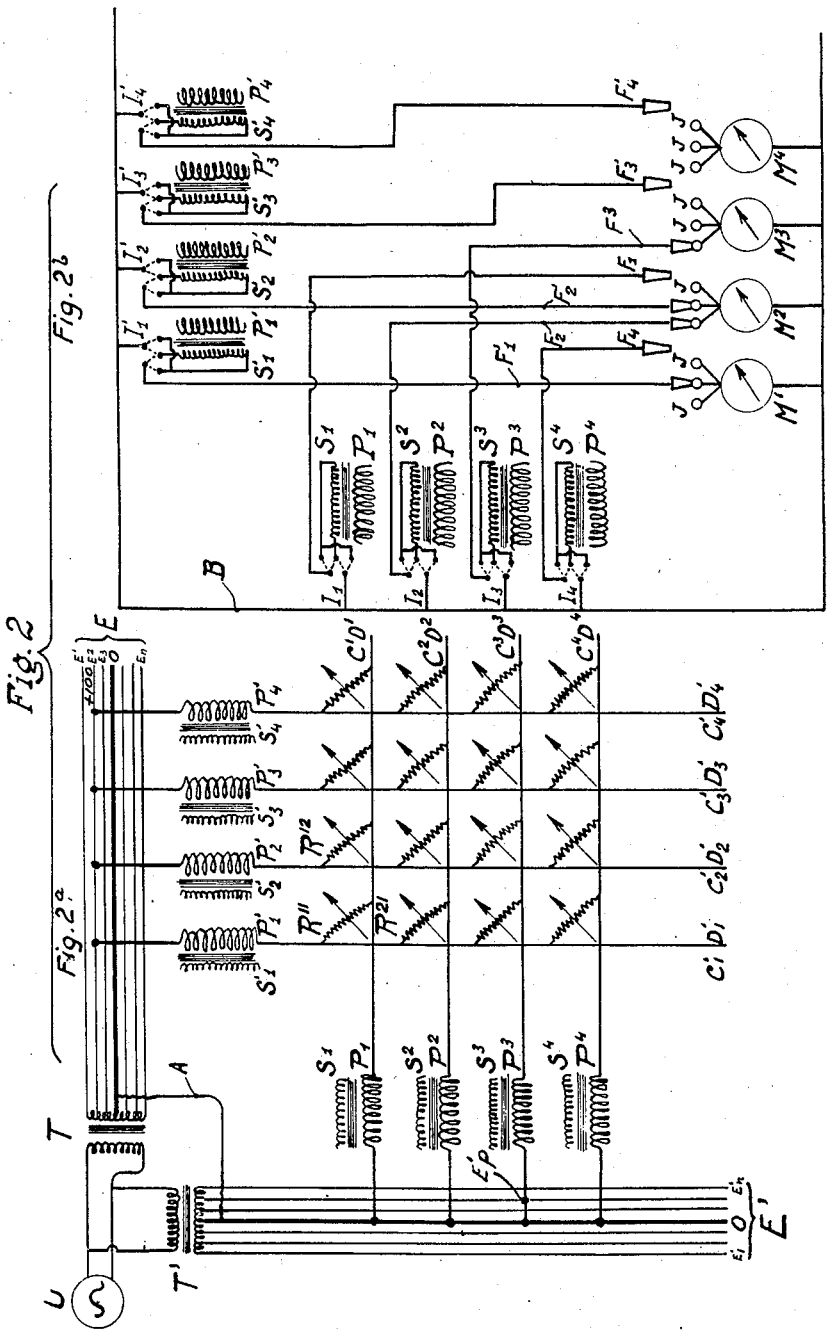

Patented Apr. 11, 1950

2,503,932

UNITED STATES PATENT OFFICE 2,503,932

ELECTRIC CALCULATING MACHINE

Raymond Alphonse Marie Barbey, Paris, France

Application October 17, 1947, Serial No. 780,501
In France October 22, 1946

5 Claims. (Cl. 235—61)

The invention has for its object to provide an electric calculating machine which makes it possible to transpose electrically a system of linear functions of several variables, of the form:

(1)
$$a_1x + b_1y + c_1z + \ldots = k_1$$
$$a_2x + b_2y + c_2z + \ldots = k_2$$
$$a_px + b_py + c_pz + \ldots = k_p$$
$$a_nx + b_ny + c_nz + \ldots = k_n$$

for the purpose of studying the concomitant variations thereof, once the value of the parameters $a_1, a_2 \ldots b_1, b_2 \ldots$ has been fixed, by varying the variables $x, y, z, \ldots$ A further object of the invention is to provide a machine by means of which the behaviour of a system of equations only involving a certain number of the functions of the system (1) can be studied, and a system of equations derived from the first system can be solved, if required, by the method of successive approximations, as will be explained hereinafter.

The calculating machine according to the invention essentially comprises in combination a translating circuit hereinafter called "translator" and a combining circuit hereinafter called "combiner"; the translator, in its simplest form, comprises a series of electric conductors, hereinafter called "distributors," which are respectively connected to an equal number of sources of current of adjustable positive or negative voltages, which are respectively proportional to the value of the variables $x, y, z \ldots$ of the system of equations to be studied, a series of electric conductors hereinafter called "collectors," each of which is connected to all the distributors through a variable resistance, the conductance of which represents the value of a respective parameter of the system of equations to be studied, and each of which is in series with the primary of a transformer; whereas the combiner essentially comprises the secondaries of said transformers, a set of measuring instruments, each provided with multiple tappings, and connectors for selectively connecting the secondaries of the transformers to the measuring instruments in order to measure the algebraical sum of the currents flowing through those secondaries which are connected to the measuring instruments.

Further objects and features of the invention will become apparent from the ensuing description, with reference to the accompanying drawings, which are given solely by way of example, and in which:

Fig. 2 shows a symmetrical circuit, Fig. 2ª showing the circuit of the translator and Fig. 2ᵇ the circuit of the combiner.

Figure 1:
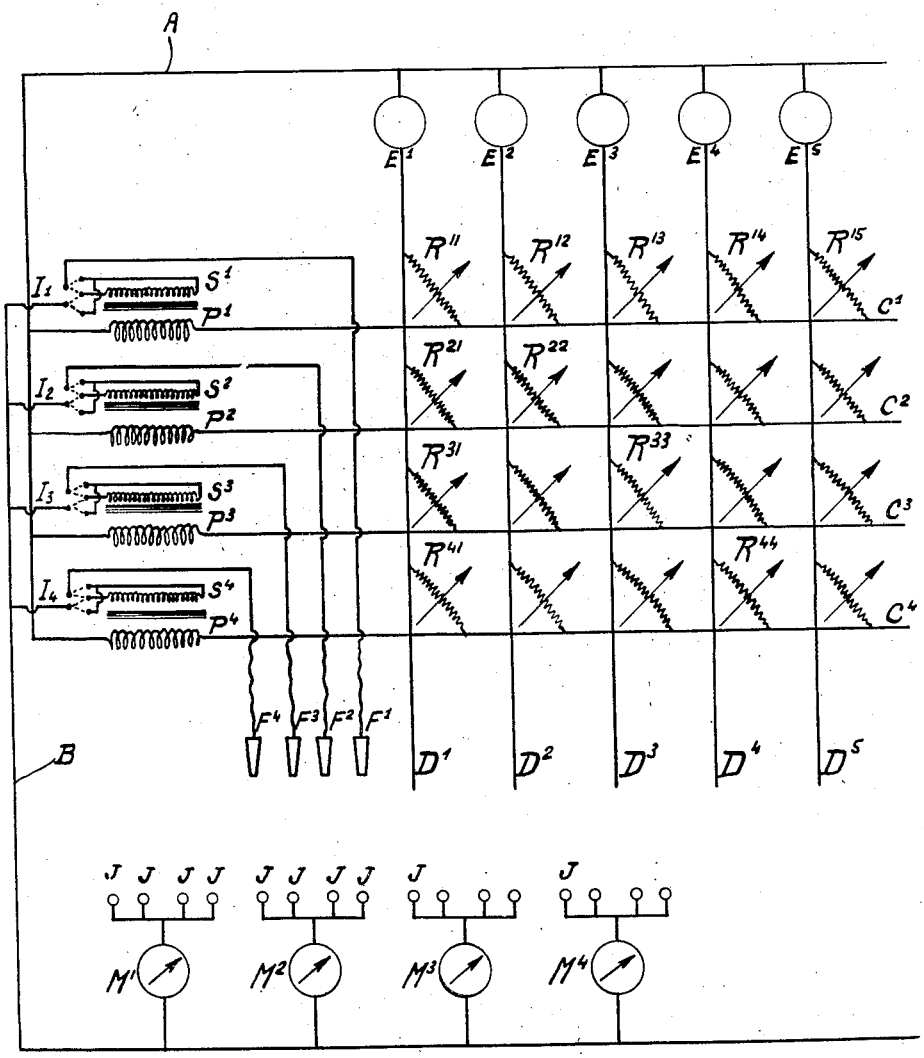
Fig. 1 shows a diagram of the machine in its simplest form.

Referring to Fig. 1, $D_1$, $D_2$, $D_3$ . . . denote a series of electric conductors called "distributors," respectively connected to a source of current $E_1$, $E_2$, $E_3$ . . . of adjustable predetermined voltage, $C_1$, $C_2$, $C_3$ . . . a series of electric conductors called "collectors," each of which is connected to all the distributors D through a variable resistance $R_{11}$, $R_{12}$, $R_{13}$ . . . $R_{21}$, $R_{22}$, $R_{23}$, etc. and is in series with the primary $P_1$, $P_2$, $P_3$ . . . of a transformer. The circuit is closed by a return conductor A and the whole arrangement forms the translating circuit or "translator."

The secondaries $S_1$, $S_2$, $S_3$, etc., of the transformers are connected to connectors, for example flexible leads provided with jacks $F_1$, $F_2$, $F_3$, which can be selectively inserted in tappings or sockets J of current measuring instruments $M_1$, $M_2$, $M_3$. . . . The circuit is closed by a return conductor B and the whole arrangement forms the combiner. The polarity of each transformer secondary can be reversed by means of a reversing switch $I_1$, $I_2$, $I_3$. . . .

It can be readily seen that the translator concretizes a system of polynomials such as:

$$a_1x + b_1y + c_1z + \ldots$$
$$a_2x + b_2y + c_2z + \ldots$$
$$a_3x + b_3y + c_3z + \ldots$$

and the combiner concretizes the relations between these polynomials, since the conductance reciprocals of the variable resistances $R_{11}$, $R_{12}$, $R_{13}$ . . . express the parameters $a_1$, $b_1$, $c_1$ . . . whereas the electric voltages of the sources $E_1$, $E_2$, $E_3$ . . . and distributors $D_1$, $D_2$, $D_3$ . . . express the variables $x, y, z$. . . .

If it is desired to study the variations of the various polynomials above referred to, the resistances R are adjusted in proportion to the parameters $a, b, c$, etc. and the jacks F are plugged into the sockets J of the measuring instruments M.

If said jacks are respectively connected to each of the instruments M, the elemental currents which flow into collector $C_1$ through resistances $R_{11}$, $R_{12}$, $R_{13}$ are proportional to the conductances of same and to the voltages of the sources $E_1$, $E_2$, $E_3$ and also to the impedance of the primary $P_1$ of the transformer in circuit with collector $C_1$ and to the impedance of meter $M_1$. However, the primaries P of the transformers and the meters M are so devised that their impedances are negligible relatively to the impedances of resistors R, so that the total current flowing through primary $P_1$ can be regarded as substantially equal to the sum of the elemental currents above referred to. Practically, neglecting the impedances of primaries P and meters M introduces a systematical relative error of $1/1000$ nd., i. e. of the same order of magnitude as the relative errors of reading and adjustment, which are not systematical but are variable in magnitude and sign (positive or negative). This systematical relative error is usually much smaller than the relative error affecting the data on which the calculations by the machine are to be based, said data being mostly of a statistical nature and of a degree of accuracy less than $1/1000$ nd.

From the above explanations, it is clear that the readings on meters M will be approximately the values K assumed by each of the polynomials for the instantaneous values of the variables $x, y, z \ldots$ determined by the instantaneous voltage of the corresponding source E, i. e. it will be possible to read at each instant the values $K_1, K_2, K_3 \ldots$ of the functions:

$$a_1x + b_1y + c_1z \ldots = K_1$$

$$a_2x + b_2y + c_2z \ldots = K_2 \text{ etc.}$$

It is thus possible to plot curves or families of curves under extraordinary conditions of speed.

It is also possible, by connecting for example the jacks $F_1$ and $F_2$ to the sockets J of the same measuring instruments $M_1$, to read on same the value $K_1 + K_2$ of the function:

$$(a_1 + a_2)x + (b_1 + b_2)y + (c_1 + c_2)z + \ldots = K_1 + K_2$$

By reversing the polarity of the secondary of the transformer $S_2$ by means of the reversing switch $I_2$, it will be possible to read on the instrument $M_1$ the value $K_1 - K_2$ of the function:

$$(a_1 - a_2)x + (b_1 - b_2)y + (c_1 - c_2)z + \ldots = K_1 - K_2$$

By reversing the polarity of the secondary of the transformer $S_3$ by means of the reversing switch $I_3$ and connecting the jacks $F_1, F_2, F_3$ to the sockets J of the same instrument M, and jack $F_4$ to a jack J of measuring instrument $M_2$, it will be possible this time to read on measuring instrument $M_1$ the value $K_1 + K_2 - K_3$ of the function:

$$(a_1 + a_2 - a_3)x + (b_1 + b_2 - b_3)y + (c_1 + c_2 - c_3)z + \ldots = K_1 + K_2 - K_3$$

and on measuring instrument $M_2$ the value $K_4$ of the function:

$$a_4x + b_4y + c_4z + \ldots = K_4$$

It will be seen that this device makes it possible to ascertain at each instant and simultaneously the algebraic sums of several systems of any number of polynomials, prefixed by the sign plus or minus.

It also makes it possible to solve by successive approximations a system of equations of the form:

$$a_1x + b_1y + c_1z + \ldots - K_1 = 0$$

$$a_2x + b_2y + c_2z + \ldots - K_2 = 0 \text{ etc.}$$

Assume for the sake of simplicity that it is required to solve the system of equations:

$$a_1x + b_1y = K_1$$

$$a_2x + b_2y = K_2$$

The conductances of the resistances $R_{11}, R_{12}, R_{21}, R_{22}$ are adjusted to the values of the parameters $a_1, b_1, a_2, b_2$ and the jacks $F_1, F_2$ are inserted into respective sockets J of the instruments $M_1, M_2$.

On the other hand, the resistances $R_{13}, R_{14}, R_{15}$; $R_{23}, R_{24}, R_{25}$; $R_{31}, R_{32}, R_{34}, R_{35}$; $R_{41}, R_{42}, R_{43}, R_{45}$, are adjusted to an infinite value. The jacks $F_3 F_4$ are inserted into further respective sockets J of the instruments $M_1, M_2$. Finally, the resistances $R_{33}$ and $R_{44}$ are adjusted so that they supply currents $K_1, K_2$ to the collectors $C_3, C_4$.

For this purpose, the conductance of resistor $R_{33}$ will be adjusted to say $1/100$ the numerical value of $K_1$ and the voltage of source $E_3$ to 100.

It will be readily understood that the current of the distributor $D_1$ is distributed between the collectors $C_1, C_2$ only, the resistances $R_{31}, R_{41}$ being infinite. The current of the distributor $D_2$ is likewise distributed between the collectors $C_1, C_2$. The current of the distributor $D_3$ supplies the collector $C_3$ through the single resistance $R_{33}$, and the distributor $D_4$ supplies the collector $C_4$ through the single resistance $R_{44}$.

The circuit of the distributor $D_5$ is open.

On the instrument $M_1$ can be read the difference:

$$a_1x + b_1y - K_1 = n_1$$

(the secondaries of the transformers $S_1$ and $S_3$ being in opposition) and on the instrument $M_2$ can be read the difference:

$$a_2x + b_2y - K_2 = n_2$$

(the secondaries of the transformers $S_2$ and $S_4$ being in opposition).

In order to solve the system of equations, it is necessary that $n_1 = n_2 = 0$.

The operation is effected by successive approximations. The well known method, generally used in conventional electric computers, consists in appointing to each unknown, such as $x$, a certain polynomial, the numerical value of which is the most affected by the variations of $x$, and similarly to unknown $y$ another polynomial, whose numerical value is predominantly affected by the variations of $y$, and so on. The appointment or selection will be made easier when the several parameters $a, b, c$, etc. of the polynomials have been reduced to percentages. In most cases, the selection will be such that to unknown $x$ for example will correspond that polynomial where the parameter $a$ multiplying unknown $x$ has the largest percentage.

Once the correspondence between the various unknowns and polynomials is determined, the value of the polynomial appointed to $x$ is brought to zero by arbitrarily fixing unknowns $y, z$, etc. . . . and varying the corresponding unknown $x$. The polynomial appointed to $y$ assumes a certain value, which is brought to zero by varying the corresponding unknown $y$.

This affects the value of all other polynomials where $y$ is present, and in particular of the first polynomial which assumes a definite value, different from zero. The same method is applied to the various unknowns and polynomials, until the value of the last polynomial is zero.

The value of the first polynomial is again brought to zero by a new variation of $x$ and the same process as above is repeated, which lessens the absolute values of all polynomials and it is repeated again, until the values of all polynomials are annuled.

For example, assume that in the system of equations $$a_1x + b_1y - k_1 = n_1 = 0$$

$$a_2x + b_2y - k_2 = n_2 = 0$$

the parameters $a$ and $b$ are reduced to percentages:

$$a_1 + b_1 = 100$$

$$a_2 + b_2 = 100$$

The comparison between $a_1$ and $a_2$ shows the equation in which the unknown $x$ has the heavier coefficient. Assume $a_1$ greater than $a_2$; the first equation will be appointed to the unknown $x$, and the second equation to unknown $y$. Consequently, the voltage $W_1$ of source $E_1$ (corresponding to unknown $x$) is first adjusted so that $n_1 = 0$. Then, leaving $W_1$ constant, the voltage $W_2$ of the source $E_2$ (corresponding to unknown $y$) is adjusted so that $n_2 = 0$. For this value of $W_2$, $n_1$ assumes a positive or negative value $n'_1$ which is again reduced to zero by modifying $W_1$, which changes $n_2$ from zero to $n'_2$ and so forth.

In practice, the differences $n$ do not always have to be reduced to zero. For example, in the case of an economic problem, the difference between the production $$a_1x + b_1y + c_1z \ldots = K_1$$

and the consumption $$a_2x + b_2y + c_2z \ldots = K_2$$

is expressed by a difference $K_1 - K_2$ representing the stocks. Similarly, the difference between a selling price and a cost price represents a profit or a loss. By placing in opposition in a measuring instrument M the currents measuring the values $K_1$, $K_2$ of two polynomials, it is possible to follow for example the fluctuations of the losses or profits according to the variations of $x$ (labour), $y$ (value of money), $z$ (taxes), etc.

In other applications, such as the calculations of the proportions of mixtures (as in petroleum, siderurgical, metallurgical processes), it is necessary on the contrary to solve the system of equations, i. e. to find the values of the unknowns which simultaneously nullify all the differences. This operation is effected by successive approximations, by varying continuously or discontinuously the electric elements representing the unknowns, in such a direction that the differences $n$ are decreased until they are all simultaneously reduced to zero.

On the other hand, in the case in which certain parameters such as $a, b, c \ldots$ assume negative values, it is necessary to associate the corresponding variable resistances with those distributing conductors which are supplied by sources whose polarity is reversed relatively to those supplying the resistances representing parameters of positive sign. The transposition of the mathematical equations on the electric plane therefore necessitates the grouping, on one and the same distributor corresponding to a certain variable $x$, for example, of all the monomials of negative parameter.

Thus in the system of polynomials:

$$ax + by + cz \ldots$$

$$-a'x + b'y + c'z \ldots$$

four distributors are used, two of which are allotted to the variable $x$, one being supplied at a positive voltage, and the other at a negative voltage.

In the foregoing explanation, it has been assumed that each of the various polynomial functions or equations was expressed by a "collector" supplied by several "distributors," said collectors and distributors performing quite distinct functions.

Now, in practice, certain problems of economic statistics for example are expressed by systems of equations forming a double entry chart, the interest of the study being a comparison between the totals of the horizontal lines and those of the vertical lines.

Take for example the study of the economic interchanges within a State, and for the sake of simplicity, assume that the economist has merely provided for the four following branches of activity: State, Credit, Agriculture, Industry. A double entry chart, prepared in accordance with the method called "Input-output analysis" by Professor W. W. Leontieff, "The Quarterly Journal of Economics," February 1943, February 1946, is drawn up as follows:

|  | State | Credit | Agriculture | Industry | Totals | Profits and Losses |
|---|---|---|---|---|---|---|
| State | $Q_{11}$ | $Q_{12}$ | $Q_{13}$ | $Q_{14}$ | $H_1$ | $P_1$ |
| Credit | $Q_{21}$ | $Q_{22}$ | $Q_{23}$ | $Q_{24}$ | $H_2$ | $P_2$ |
| Agriculture | $Q_{31}$ | $Q_{32}$ | $Q_{33}$ | $Q_{34}$ | $H_3$ | $P_3$ |
| Industry | $Q_{41}$ | $Q_{42}$ | $Q_{43}$ | $Q_{44}$ | $H_4$ | $P_4$ |
| Totals | $V_1$ | $V_2$ | $V_3$ | $V_4$ |  |  |

At the intersections of the lines and columns, the values $Q_{11}$, $Q_{12}$ ... $Q_{21}$, $Q_{22}$ ... etc. represent, in suitable units, the interchanges between the various groups, the horizontal lines showing the receipts or takings and the vertical lines the expenditure or outlay.

Thus, $Q_{11}$, considered horizontally, represents the receipts of the State (taxes) from the State administrative departments, the revenue of its own estates, etc., $Q_{12}$ represents the tax levied by the State in the Credit group. $Q_{13}$ the tax levied in the Agriculture group, etc. Similarly, $Q_{21}$ represents the receipts of the group "Credit" from the "State" group (State budget, government subsidies, Brokerage due to Banks, interest on loans, etc.), $Q_{22}$ represents the receipts of the group Credit from its own administrative Departments (for example profits of the banks at the expense of its labour, etc.), $Q_{23}$ represents the receipts of the same group from the group Agriculture, etc.

It will be readily seen that the totals $H_1$, $H_2$, $H_3$, $H_4$ of the horizontal lines and the totals $V_1$, $V_2$, $V_3$, $V_4$ of the vertical lines differ two by two by a positive or negative value $P_1$, $P_2$, $P_3$, $P_4$ which represents the profits or the losses of each of the groups in question.

The following systems of equations are therefore obtained:

$$Q_{11} + Q_{12} + Q_{13} + Q_{14} + P_1 =$$
$$H_1 + P_1 = Q_{11} + Q_{21} + Q_{31} + Q_{41} = V_1$$

$$Q_{21} + Q_{22} + Q_{23} + Q_{24} + P_2 =$$
$$H_2 + P_2 = Q_{12} + Q_{22} + Q_{32} + Q_{42} = V_2$$

and so forth.

For studying a system of this type, the following equations could be expressed in the translating circuit:

$$Q_{11} + Q_{12} + Q_{13} + Q_{14} = H_1$$

$$Q_{21} + Q_{22} + Q_{23} + Q_{24} = H_2$$

$$Q_{11} + Q_{21} + Q_{31} + Q_{41} = V_1$$

$$Q_{12} + Q_{22} + Q_{32} + Q_{42} = V_2$$

by as many horizontal collectors (i. e. 8 collectors in the example chosen) and the following comparisons effected:

$$P_1 = V_1 - H_1$$

$$P_2 = V_2 - H_2$$

by connecting the jacks or the secondaries corresponding to the collectors giving $V_1$ and $H_1$ in opposition across a measuring instrument $M_1$, the jacks of the collectors giving $V_2$ and $H_2$ in opposition across a measuring instrument $M_2$ and so forth.

In this case, however, it is possible to decrease the number of circuits by providing a symmetrical translating circuit, i. e. a circuit in which the same conductors can indiscriminately perform the function of distributors or of collectors. For this purpose, it is only necessary to provide the collectors of Fig. 1 with electric sources such as E and the distributors of Fig. 1 with transformers such as P, S. Fig. 2 shows a circuit of this type in which, for greater convenience, the translation circuit and the combining circuit have been shown separately (Fig. 2ᵃ, Fig. 2ᵇ).

In this example, the individual sources $E_1$, $E_2 \ldots E_n$ are constituted by the multiple tappings on the secondary of a supply transformer T.

The collectors C of Fig. 1 are replaced by double-acting conductors (distributor-collector) CD and the distributors D of Fig. 1 by double-acting conductors C'D'. The primaries $P_1$, $P_2 \ldots$ of conductors CD are connected to the multiple tappings E' of the secondary of a transformer T' and the primaries of transformers $P'_1 P'_2 P'_3$, in series with conductors C'D' are connected with the multiple tappings E of the secondary of transformer T above referred to. Transformers T, T' are similar and their primaries are supplied by a common source U. The mid-points or "zero" tappings of the secondaries of transformers T, T' are connected together by a conductor A supplying a certain voltage which is considered as the zero or basic potential.

Tappings $E_1 \ldots E_n$ and $E'_1 \ldots E'_n$ supply the desired positive and negative voltages, such as 50, 100, 150, etc.

The provision of a pair of transformers T and T' supplied by a common source U is preferable to individual source, because it is simpler and makes negligible any error due to voltage drop in the source. Moreover, the measurement of voltages can be dispensed with, and replaced by the reading of a voltage scale associated with the multiple tappings E, $E_1$. However any other arrangement of potentiometer or individual sources may be used, provided it permits of feeding any double-acting conductor CD or C'D' with any suitable positive or negative voltage.

In the example of Fig. 2, all conductors C'D' are connected to the same tapping supplying the voltage $+100$ and all conductors CD are connected to the zero tapping. The conductances of resistors $R_{11} R_{12} \ldots R_{21} R_{22} \ldots$ etc., being adjusted to the respective numerical values of $Q_{11}/100$, $Q_{12}/100 \ldots Q_{21}/100$, $Q_{22}/100 \ldots$ etc., the transformers $P_1 S_1$, $P_2 S_2 \ldots$ will yield a current $H_1$, such that $$H_1 = Q_{11} + Q_{12} + Q_{13} + Q_{14}$$

whereas the transformers $P'_1 S'_1$, $P'_2 S'_2 \ldots$ will yield a current $V_1$, such that $$V_1 = Q_{11} + Q_{21} + Q_{31} + Q_{41}$$

The combiner (Fig. 2ᵇ) comprises a corresponding number of secondaries SS' provided with flexible cords with jacks F, F' which can be inserted into the sockets J of measuring instruments M.

In the example of connection of Fig. 2ᵇ, the measuring instrument $M_1$, gives the total $V_1$ hereinbefore mentioned, i. e. the expenditure of the State; the instrument $M_2$ gives the difference between the receipts and the expenditure of the group 2, i. e. $V_2 - H_2$, which is the profit or the loss of the group Credit; the instrument $M_3$ gives the total $H_3$, i. e. the receipts of the group Agriculture.

It can be seen that the device of Fig. 2 makes it possible to study a very large number of functions, in particular those which are involved in the calculation of accounts, in which a value governed by a conservative principle is represented by an electric current which subsists from end to end of any closed circuit.

In such applications, it often happens that a parameter (selling price, economical index, etc.) can be factorized as a common factor of all the terms of the polynomial. This common factor may be expressed by the voltage of one of the conductors CD, C'D', and changing the tapping thereof will alter said common factor accordingly. For example, if in the foregoing double entry chart, agricultural prices undergo an average increase of 10%, it primarily produces an increase by 10% of the values $Q_{31}$, $Q_{32}$, $Q_{33}$ and $Q_{34}$. Instead of altering the conductances of resistors $R_{31}$, $R_{32}$, $R_{33}$, $R_{34}$, it is much simpler to increase by 10% the voltage difference between conductor $C_3 D_3$ and conductors $C'_1 D'_1$, $C'_2 D'_2$, $C'_3 D'_3$ and $C'_4 D'_4$ by tapping conductor $C_3 D_3$ at tapping $E'_p$, the voltage of which is $-10$. The voltage difference for conductor $C_3 D_3$ will rise from 100 to 110 and the currents flowing through resistors $R_{31}$, $R_{32}$, $R_{33}$, $R_{34}$ into conductor $C_3 D_3$ will all be increased by 10%.

In the foregoing examples, it has been implicitly assumed that the measuring instruments M give the instantaneous value of the current. But it is also possible to use totalizing meters enabling said instantaneous values to be integrated in time by varying the parameters and variables according to any desired law.

Such totalizing meters may be of a type similar to conventional subscribers' meters.

A method of computation may be as follows: Supposing that the parameters and unknowns assume certain values at the time $t_0$, other values at the time $t_1$, still other values at the time $t_2$, etc. ... the machine is adjusted at the values corresponding to the instant $t_0$ and started and operated for a duration $t_1 - t_0$ and the results are read on the totalizing meters. Then the machine is stopped and reset to the values corresponding to instant $t_1$ and re-operated for a duration $t_2 - t_1$, and the results are registered by the totalizing meters, adding to the previous respective figures, etc. ... Upon completion of the operation, the totalizing meters will have integrated the variations of the values of the polynomials in accordance with the variations of the parameters and unknowns as functions of the time.

Of course, the invention is in no way limited to the embodiments illustrated and described, which have only been chosen by way of example.

Having now described my invention, what I claim as new and desire to secure by Letters Patent is:

1. An electric calculating machine for studying the variations of linear functions of several variables and for solving systems of equations with several unknowns comprising in combination a translating circuit hereinafter called "translator" and a combining circuit, hereinafter called "combiner," the translator comprising a series of electric conductors hereinafter called "distributors," a corresponding number of sources of current of adjustable positive or negative voltage respectively representing the value of one of the variables of the system of equations to be studied, respectively connected to said distributors, a series of electric conductors hereinafter called "collectors," resistors of variable conductance, the latter respectively representing the value of one of the parameters of the system of equations to be studied, each resistor connecting each distributor to every collector, a number of transformers corresponding to the number of said collectors, the primary of each transformer being in series with a respective collector, and a common return conductor for closing the parallel circuits including said sources, said distributors, said collectors and said primaries through said resistors, whereas said combiner essentially comprises the secondaries of said transformers, a set of measuring instruments, each provided with multiple tappings, connectors for selectively connecting the secondaries of said transformers to said measuring instruments, whereby the latter measure the algebraic sums of the currents flowing through those secondaries which are connected to the measuring instruments, and a common return conductor for closing the parallel circuits including said secondaries, said connectors and said meters.

2. An electric calculating machine as claimed in claim 1, further comprising reversing switches respectively connected with the outlet terminals of the secondaries of said transformers and said connectors, whereby the currents supplied from said secondaries to said measuring instruments can be added together or subtracted from one another, in accordance with the selective positions of said reversing connectors.

3. An electric calculating machine as claimed in claim 1, which further comprises a number of electrical sources of adjustable voltage corresponding to the number of said collectors, respectively connected with said collectors, and a number of transformers corresponding to the number of said distributors, the primaries of said transformers being respectively connected with said distributors, whereby the two series of conductors are adapted to perform both the functions of distributors and collectors, and connectors associated with the secondaries of said second-mentioned transformers and adapted to be selectively connected to said measuring instruments, said first-mentioned return conductor being connected in parallel with all said sources and primaries, and said second-mentioned return conductor being connected in parallel with all said secondaries, connectors and meters.

4. An electric calculating machine as claimed in claim 1, wherein said electrical sources consist of a feeding transformer with multiple tappings.

5. An electric calculating machine as claimed in claim 1, wherein said measuring instruments are totalizing meters adapted to integrate the variations of the currents as functions of time.

RAYMOND ALPHONSE MARIE BARBEY.

No references cited.